Nov. 22, 1960  D. F. ELWELL  2,960,875
CONTROL APPARATUS

Filed Aug. 28, 1958  2 Sheets-Sheet 1

INVENTOR.
DONALD F. ELWELL
BY Roger W. Jensen
ATTORNEY

Nov. 22, 1960  D. F. ELWELL  2,960,875
CONTROL APPARATUS
Filed Aug. 28, 1958  2 Sheets-Sheet 2
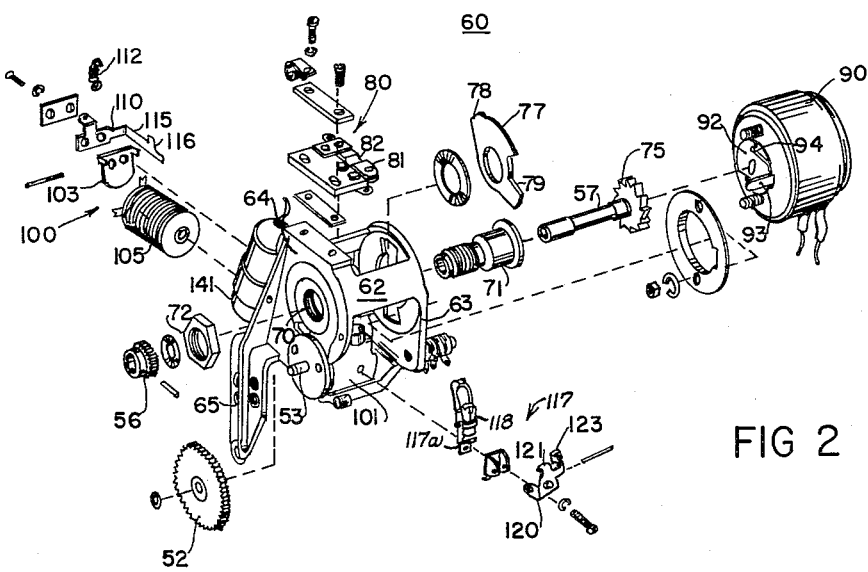
FIG 2
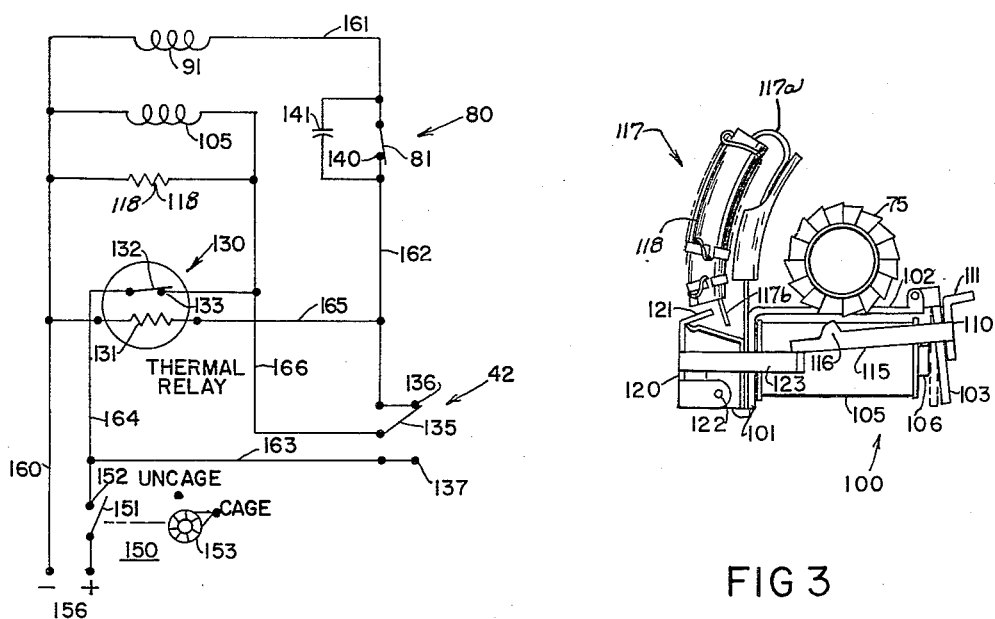
FIG 4
FIG 3
INVENTOR.
DONALD F. ELWELL
ATTORNEY

United States Patent Office 2,960,875
Patented Nov. 22, 1960

2,960,875

CONTROL APPARATUS

Donald F. Elwell, Columbia Heights, Minn., assignor to Minneapolis-Honeywell Regulator Company, Minneapolis, Minn., a corporation of Delaware Filed Aug. 28, 1958, Ser. No. 757,855

11 Claims. (Cl. 74—5.1)

This invention pertains generally to gyroscopic apparatus and more specifically to improvements in a caging mechanism for a gyroscope comprising in part a rotor member mounted on a gimbal adapted to be rotated about a gimbal axis. A wide variety of caging configurations have been incorporated into gyroscope designs during the development of gyroscopes. The present invention has application in combination with caging mechanisms that comprise in part motor means for rotating a gimbal or gimbals to either a caged or uncaged position. An example of this type of arrangement to which the present invention may be applied is the Brown Patent 2,645,129, issued July 14, 1953, and assigned to the same assignee as the present invention. In said Brown patent two arrangements are shown. The first involves the use of a motor means to cage the gyro rotor and uses spring means for uncaging the gyro rotor. The second arrangement is the converse of the first inasmuch as it uses the spring means to cage the gyro and uses motor means for uncaging the gyro. In the referenced patent limit switch means are shown in combination with the energization circuit to the motor means for de-energizing the motor upon the rotor case being brought to its caged or uncaged condition. The de-energization of the motor means at that time is desirable in order to prevent the motor from burning out, it being understood that additional holding means are provided for keeping the rotor case in its caged or uncaged condition at that time.

A problem with the above type of arrangement occurs occasionally when for some reason the motor means is unable to drive the rotor case to its full caged or full uncaged condition so as to, among other things, actuate the limit switch means which de-energize the motor. When this happens the motor means is damaged by an excessively long period of energization. One of the aspects of the present invention therefore is to provide a means which is responsive to the energization to the motor means associated with a caging mechanism and which after a predetermined length of time will serve to de-energize the motor means regardless of whether or not the rotor case has been caged or uncaged.

Another problem occurs with the caging mechanisms as broadly described above in that occasionally the power energizing the holding means which maintains the gyro in either the caged or uncaged position will fail or be temporarily interrupted. This tends to automatically return the gyroscope to its other condition. For example, if the gyro had been operating or in other words had been uncaged, upon temporary interruption in power the caging mechanism would try to cage the gyroscope. Conversely if the gyroscope had been held in a caged position by the holding means and the power was temporarily interrupted then the gyro caging mechanism would attempt to uncage the gyro. Gyroscopes of this type are used as flight control apparatus for aircraft wherein the power supply is provided internally of the aircraft for most purposes but usually when the aircraft is on the ground an auxiliary or ground power supply will be used which necessitates a temporary interruption in power when the load devices on the aircraft are being switched over from the ship's power to the ground power. There further usually are interruptions or dips in the level of the voltage in the power supply when the engines of an aircraft are started due to the large currents drawn by the starting means. Another aspect of the present invention is to provide a means which will maintain a gyroscope either in a caged position or in an uncaged position for a predetermined time interval after the de-energization of the normal holding means.

It is an object of this invention therefore to provide an improved gyroscopic apparatus.

A further object of the invention is to provide an improved caging and uncaging arrangement for a gyroscopic apparatus.

These and other more specific objects of the invention will become more apparent from a reading of the complete specification and appended claims in conjunction with the drawings in which:

Figure 2 is an exploded view of part of the drive mechanism in the caging mechanism for the gyroscope shown in Figure 1;

Figure 3 is a view of some of the interrelated parts associated in the holding means of the mechanisms shown in Figures 1 and 2; and Figure 4 is a schematic diagram of the electrical circuit associated with the caging mechanism as shown in Figures 1–3.

Figure 1:
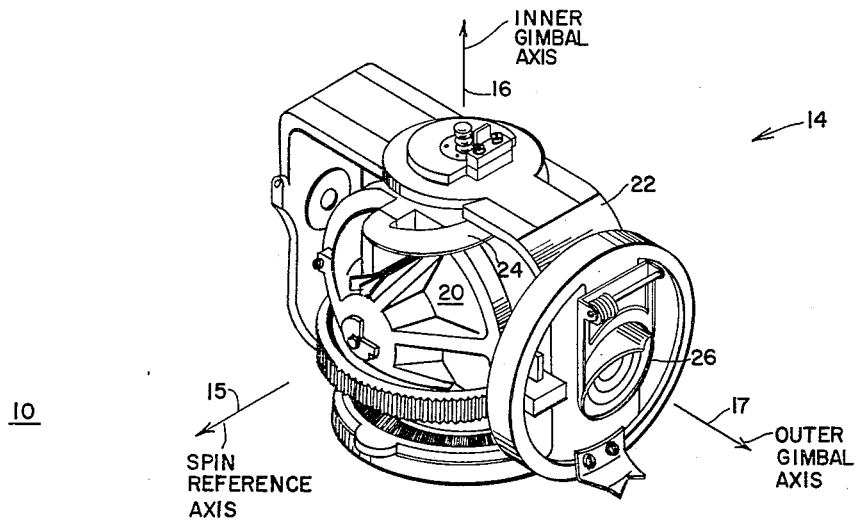
Figure 1 is a semi-exploded view of a two axis displacement gyroscope to which is applied the present invention.
Figure 1:
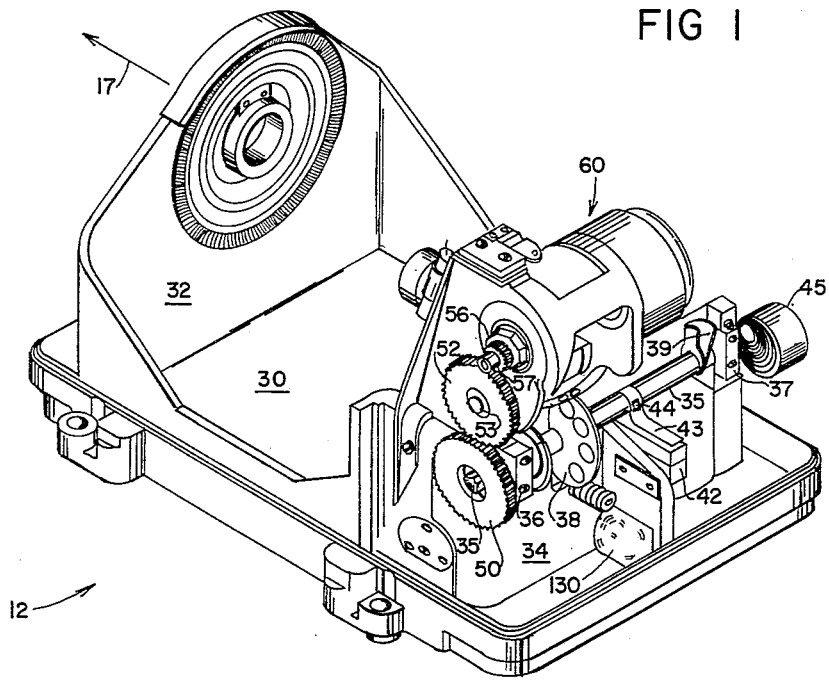

Referring to Figure 1, the reference numeral 10 generally depicts a two axis displacement gyroscope including two major subassemblies, a base assembly generally identified by the reference numeral 12 and a gimbal assembly generally identified by reference numeral 14. By "two axis" is meant that in addition to the rotor being permitted to rotate about a spin reference axis identified in Figure 1 by reference numeral 15, the rotor is supported for relative rotation about a pair of mutually perpendicular displacement axes identified in Figure 1 as an inner gimbal axis 16 and an outer gimbal axis 17.

Generally speaking a rotor (not shown) is enclosed within a rotor case 20 and is mounted on bearings for rotation about the spin reference axis 15 and suitable means such as electric winding means are used for imparting a rotation to the rotor. The rotor case 20 in turn is mounted on suitable bearings located in an outer gimbal 22 for pivotal movement about the inner gimbal axis 16. The outer gimbal 22 in turn is adapted to be supported by suitable means including the base assembly 12 for rotation about the outer gimbal axis 17.

A cam means 24 attached to the rotor case or inner gimbal 20 and a cam means 26 mounted on the outer gimbal 22 are used in the caging mechanism for the gyroscope shown and are analagous to cam members 62 and 60 of the above identified Brown patent. A further detailed discussion of the caging mechanism is not essential to an understanding of the present invention but if additional details are desired for general information purposes, reference can be made to said Brown patent.

The base assembly 12 shown in Figure 1 includes a main flat support section 30 having a pair of general upstanding end support members 32 and 34. A shaft member 35 is supported for rotation relative to the upstanding portion 34 by suitable means including a pair of bearing blocks 36 and 37. A pair of cams 38 and 39 are secured to the shaft 35 for rotation therewith and cooperate with the cam means 24 and 26 on the gimbal assembly 14 in the same general manner as is disclosed in the above referenced Brown patent for sequentialy caging the rotor case 20 and the outer gimbal 22 of the gimbal assembly.

A precision snap switch 42 is mounted on a suitable flange on the upstanding portion 34 of the base and includes an actuating arm 43 adapted to be contacted by a suitable cam-like member 44 mounted on the shaft 35, the relationship of cam 44 and arm 43 being such that when the shaft 35 is in a position corresponding to the gyro being in the fully uncaged position the precision snap switch means 42 will be actuated..

A coiled spring member 45 has one extremity connected to shaft member 35 and has the other extremity secured by suitable means to the base member 34, the action of spring means 45 being to tend to rotate shaft 35 in the direction resulting in the caging of the gyroscope.

A drive gear member 50 is attached to the opposite end of shaft 35 from the spring means 45 and is adapted to mesh with an idler gear 52 mounted for rotation on a suitable support 53 and which in turn is adapted to mesh with a pinion gear 56 secured to a drive shaft 57. The drive shaft 57 is adapted to be driven by motor means to be described in greater detail below in such a direction so as to drive through the pinion gear 56, idler gear 52, to the drive gear 50 mounted on shaft 35 so as to rotate the shaft and the cams 38 and 39 thereon in a direction so as to uncage the gimbal assembly 14.

The driving mechanism for the drive shaft 57 is generally identified in Figure 1 by the reference numeral 60 and it is shown in considerably more detail in the exploded drawing in Figure 2.

The drive motor assembly 60 includes a basic hollow frame-like member 62 having a pair of spaced parallel end plate portions 63 and 64, end plate portion 64 having a flange portion 65 depending therefrom, the flange 65 being used so as to mount the drive motor assembly 60 on the upstanding portion 34 of the base assembly 12. Portion 64 of the frame 62 of the motor drive assembly 60 is provided with a threaded aperture 70 into which is screwed a journal or bushing member 71 and which is fixed thereto by a nut 72, the bushing 71 in turn internally providing a rotational support for the main drive shaft 57 having a ratchet gear 75 on one end thereof and having the pinion gear 56 mounted on the other end thereof. It will be understood that rotation of shaft 57 caused by torques being applied to ratchet gear 75 will impart a rotation to the drive gear 50 through the pinion gear 56 and the idler gear 52.

A stepping switch operating cam 77 is loosely journaled externally on the bushing 71 and it includes a switch operating portion 78 and a lever arm portion 79. Switch operating portion 78 is adapted to coact with a detent portion 82 of a switch arm 81 which is a part of a stepping switch assembly generally identified by the reference numeral 80 attached by suitable means to the top of the drive motor frame 62.

A rotary solenoid motor generally identified by the reference numeral 90 is adapted to be secured to end portion 63 of the drive motor assembly frame 62 by suitable means and comprises in part a solenoid winding 91 shown only schematically in Figure 4. The internal details of the rotary solenoid are omitted herein inasmuch as they form no part of the subject invention and it is to be understood that any type of rotary actuator may be used where the output may be limited to a fractional part of a revolution of rotation. Generally this actuator is of the type wherein a solenoid plunger (not shown) has attached thereto a plate member 92 which is adapted to be rotated under the influence of the inward pull of the solenoid plunger with its magnetic structure by virtue of a plurality of ball bearings being mounted in grooved channels. An integral part of the plate 92 on the rotary solenoid assembly 90 is an arm member 93 adapted to contact the lever portion 79 on the switch operating cam 77 and also a ratchet engaging portion 94 adapted, when the rotary solenoid is energized to be displaced slightly in the axial direction as well as being rotated a fraction of a full rotation into engagement with the axial face of ratchet gear 75 attached to the main drive motor shaft 57.

A holding solenoid arrangement is provided and is generally identified by the reference numeral 100. This includes a magnetic frame member 101 attached to the main frame 62 of the drive motor assembly 60 and which includes an upstanding portion 102 shown in Figure 3 on the end of which is pivotally mounted an armature 103. A coil member 105 is mounted so that one end thereof abuts against the base portion 101 of the holding means and surrounds a central pole portion, the pole face 106 of which is shown in Figure 3. An armature extension 110 is attached to the armature 103 by suitable means and includes in part a small flange 111 to which is attached one end of a biasing spring 112, the other end of which is attached to the main frame 62 so as to hold armature 103 in a position as shown in Figure 3. It will be understood then that when the coil 105 is energized the magnetic flux produced thereby will attract armature 103 from the full line position shown in Figure 3 to the dotted line position. The armature extension 110 further has a depending lever portion 115. When coil 105 is energized so as to draw armature 103 to the dotted line position as shown in Figure 3 then a pawl-like projection 116 on depending portion 115 of the armature extension comes into engagement with the radial teeth on the ratchet gear 75. As long as pawl portion 116 is in engagement with ratchet gear 75 the motor means 90 is effective to transmit its rotation through the drive gear shaft 57 to the pinion gear 56. When the coil 105 is de-energized the spring means 112 is effective to disengage the pawl portion 116 from ratchet gear 75 so that the motor means 90 is not effective to advance the ratchet 75.

An auxiliary holding means 117 is provided and includes a U-shaped piece of bimetal 117a having one leg attached by suitable means to frame member 101 of the holding means 100 and having a winding 118 wound about the other leg thereof. The extremity of the other leg of the bimetal 117a is identified by reference numeral 117b. When winding means 118 is suitably energized the heat generated therein will be transmitted to the bimetal 117a so as to cause the free end 117b to move to the left as shown in Figure 3 considering the bight portion of member 117a as the pivotal point. The free extremity 117b of member 116 is adapted to engage the end of a flange-like portion 121 of an arm member 120 pivoted as at 122 relative to the holding coil arrangement 100. The arm assembly 120 includes a depending portion 123 which, as shown in Figure 3, is adapted to coact with the arm 115 on the armature extension 110. It will be observed in Figure 4 that coil member 105 of the holding means 100 as well as heater means 118 of the auxiliary holding means 117 are connected in parallel so that when coil 105 is energized heater 118 will also be energized. The action of the auxiliary holding means 117 is such that after heater means 118 has been energized for a short time the free extremity 117b will be displaced into engagement with the end of flange-like portion 121 on the arm 120 and will further cause the entire arm assembly 120 to pivot about its pivotal axis 122 as shown in Figure 3 so as to maintain arm 123 in engagement with arm 115 of the holding means 100. This is true even when the arm 115 is displaced by armature 103 being actuated into its energized position. The importance of this interaction between the auxiliary holding means 117 and the main holding means 100 is when coil means 105 of the holding means 100 would be temporarily de-energized such as during a change over from ship's power to ground power or when the voltage level might drop due to the starting of the engines. In this event, without the use of the auxiliary holding means 117, the spring means 45 would be effective to begin to cage the gyroscope. However, the auxiliary holding means 117 is not affected by temporary de-energization even though the heater means 118 is connected in parallel with coil 105. This is because there is a certain thermal time lag for the bimetal 117a to respond to the de-energization so that the auxiliary holding means 117 is effective to maintain through the arm 120 the pawl portion 116 on the arm 115 of the holding means 100 into engagement with the ratchet gear 75 so as to maintain the gyro in the uncaged position. In most cases the power or energization to coil 105 and heater 118 will be resumed before the bimetal 117a would move enough to permit the ratchet gear 75 to be released. If there is a permanent or long term de-energization of the coil means 105 and heater means 118 of the holding means 100 and auxiliary holding means 117 respectively then of course the bimetal 117a will be cooled to its position as shown in Figure 3 so as to release the ratchet wheel 75.

The caging apparatus further includes a thermal relay member 130 which may be mounted in any suitable part of the gyro such as portion 34 of the base assembly 12 and which is schematically shown in Figure 4 to include a heater 131 and a set of normally closed contacts 132 and 133. Figure 4 also discloses the limit switch means 42 to include a movable contact blade 135, an in contact 136 and an out contact 137. The arrangement of switch means 42 is such that when the gyroscope is in the full uncaged position which occurs after motor means 90 has been energized so as to release the rotor case 20 and outer gimbal 22 then the movable switch arm 135 is in engagement with the out contact 137. When the rotor case 20 and outer gimbal 22 are caged then the movable switch arm 135 is in engagement with in contact 136. In Figure 4 the stepping switch means 80 is schematically shown to include together with the movable switch arm 81 a cooperating fixed contact 140 with which switch arm 81 is normally in contact except when being displaced away by the action of cam portion 78 on member 77. A suitable capacitor 141 is connected across the switch means 80 so as to protect the contacts in the well known manner.

Suitable means are provided for energizing the caging mechanism, said means taking a variety of forms. As shown in Figure 4 the energizing means includes a normally open switch means 150 including a movable switch arm 151 adapted to coact with a contact 152. The switch 151 is adapted to be displaced by a suitable arrangement such as a control knob 153 displaceable between a caged position and an uncaged position. As shown the switch arm 151 is in the caged position. The uncaged position corresponds to switch arm 151 being in engagement with the contact 152. When this occurs a circuit is completed from a suitable source of electromotive force 156 which is applied to switch arm 151 as well as to a lead 160 which is connected to one side of the coil means associated with motor 90, to one side of coil 105 of the holding means 100, to one side of the heater means 118 on the auxiliary holding means 117, and to one side of the heater 131 in the thermal relay 130. A lead 161 connects the other side of coil 91 of motor means 90 to switch arm 81 of the stepping switch 80 and a lead 162 connects the fixed contact 140 of switch means 80 to the in contact 136 of the limit switch 42. The out contact 137 of switch means 42 is connected by way of a lead 163 to the fixed contact 152 of switch means 150, contact 152 also being connected by way of a lead 164 to the switch arm 132 of the thermal relay 130. The fixed contact 133 of the thermal relay 130 as well as the other sides of coils means 105 and heater means 118 of the holding means 100 and auxiliary holding means 117 respectively are connected by way of a lead 166 to the movable switch blade 135 of the limit switch means 42. A lead 165 connects the other side of heater 131 of the thermal relay 130 to lead 162 and thence to in contact 136 of the limit switch 42.

*Operation*

To explain the normal operation of the apparatus shown it may be assumed that the gyro has been caged and it is desired to uncage the gyro. Thus switch means 151 would be closed by operation of knob 153 so as to cause switch blade 151 to engage fixed contact 152. At this time the switch means 42 is in the position as shown in Figure 4 with switch blade 135 being in engagement with its in contact 136 and the stepping switch 80 is also in a position as shown in Figure 4 with switch arm 81 in engagement with its fixed contact 140. Also the thermal relay contacts 132 and 133 are in engagement. Thus when switch blade 151 contacts contact 152 energization circuits for the caging motor 91 and for the ho'ding coil 105 of holding means 100 and the heater 118 of the auxiliary holding means 117 are completed. The circuits may be traced from the source of E.M.F. 156 through lead 160 to coil 91 of motor means 90, to coil 105 of the holding means 100 and to the heater 118 of the auxiliary holding means 117. The completion of the circuit for coil means 91 of the motor 90 is through lead 161, stepping switch 80, lead 162 in contact 36 and movable switch arm 135 of switch means 42, lead 166, the thermal relay contacts 133 and 132, lead 164, and through contacts 152 and 150 of switch means 150 back to the source of E.M.F. 156. The remainder of the energization circuit for coil 105 and heater 118 of the holding means 100 and auxiliary holding means 117 respectively is through lead 166, contacts 132 and 133 of the thermal relay 130, lead 164, and contacts 152 and 151 of the caging switch 150. It will be understood that the energization of the coil 105 of the holding means 100 causes, through the action of the armature 103 being drawn into engagement with the pole face 106, the arm 115 with the pawl portion 116 thereon to be displaced into engagement with the ratchet wheel 75. The energization of the winding 91 of the motor means 90 serves to rotate the armature plate 92 thereof which rotation is transmitted through the ratchet wheel 75. For each rotation of the armature plate 92 the lever arm 93 thereon contacts the arm portion 79 on the cam member 77 which causes the cam portion 78 thereon to open up the stepping switch mechanism 80 so as to interrupt the flow of current through winding 91. Spring means internal of the motor means 90 then causes the armature plate 92 to return to its original position at which point contact 81 and 140 of the switch means 80 will once again be in engagement so as to re-energize the winding 91. This action continues at a fast rate so as to cause rotation of the pinion gear 56 which in turn is transmitted through the idler gear 52 to the drive gear 50 attached to the shaft 35 so as to uncage the gimbal assembly 14. When shaft 35 has been rotated a sufficient amount to uncage the gimbals then the limit switch means 42 is actuated so as to cause the movable switch arm 135 thereof to disengage from in contact 136 and go into engagement with out contact 137. This action in effect disconnects the winding means 91 and heater 131 of the thermal relay 130 from the source of energization but maintains energization to the coil means 105 and the heater means 118 on the holding means 100 and auxiliary ho'ding means 117 respectively. This energization circuit at this time is from the source of E.M.F. 156 through lead 160, the coils 105 and 118 in parallel, lead 166, switch contacts 135 and 137 of switch means 42, lead 163, lead 164, to contacts 152 and 151 of the switch means 150, and thence to the other side of the source of E.M.F. 156.

If some malfunction should occur so as to prevent the gyro from being fully uncaged then the thermal relay means 130 will be effective after a predetermined length of time to de-energize the winding means 91. Under normal operation the heater means 131 is energized simultaneously with the application of power to the winding 91. The energization circuit for the heater means 131 of the thermal relay 130 is from one side of the source of E.M.F. through lead 160, the heater 131, lead 165, lead 162, contacts 136 and 135 of the switch means 42, lead 166, contacts 132 and 133 of the thermal relay, lead 164, and contacts 152 and 151 of the switch means 150 to the other side of the source of E.M.F. 156. It will be understood that as soon as the gyro is controlled to the uncaged condition so as to cause switch arm 135 to disengage its in contact 136 then the energization circuit for the heater 131 of the thermal relay means 130 is broken. If the gyro for some reason is not fully uncaged in the proper length of time then the heater means 131 is effective to cause the switch arm 132 to disengage from its fixed contact 133 which de-energizes the winding means 91 on the motor 90 as well as coil 105 and heater 118 of the holding means 100 and auxiliary holding means 117 respectively. After a suitable length of time the movable contact 132 will re-engage its fixed contact 133 due to the fact that when the thermal relay means 130 de-energizes the winding means 91 so as to protect it from being burnt out it also de-energizes its own heater 131. When the movable contact 132 re-engages its fixed contact 133 this permits the caging mechanism to try again to uncage the gyroscope through the process as outlined above in connection with normal operation. In many cases the malfunction which is responsible for preventing the full uncaging of the gyro in one sequence may not reoccur so that upon the second cycle of operation the gyro will be fully uncaged. If however the malfunction is still present then the thermal relay means 130 will again be effective to disable the winding means 91 of motor means 90 prior to any dangerous overheating thereof so as to protect it.

It will be further understood that the coil means 105 and the heater means 118 of the holding means 100 and of the auxiliary holding means 117 respectively are effective in the manner described above so as to permit the normal ratcheting of ratchet wheel 75 by the motor means 90, the holding means 100 being primarily responsible for maintaining the pawl member 116 into engagement with the ratchet wheel 75. It will be further understood that upon temporary interruptions in the voltage developed by the source of E.M.F. 156 that the auxiliary holding means 117 will be effective to maintain the pawl portion 116 in engagement with the ratchet wheel 75 due to the fact that after a short energization of the heater 118 the bimetal 117a is displaced from the position shown in Figure 3 so that the free extremity 117b thereof displaces arm member 120 counter-clockwise as shown in Figure 3 to the position wherein the extremity 123 thereof is still in engagement with arm 115 on the holding means 100 when the pawl portion thereof is in engagement with the ratchet wheel 75.

When it is desired to cage the gyroscope then switch means 150 is actuated by knob 153 so that switch arm 151 disengages fixed contact 152. This de-energizes the motor means 90, as well as the holding means 100 and the auxiliary holding means 117. The gimbal assembly 14 is then caged by the action of the spring means 45 which is free to rotate the shaft 35 inasmuch as shaft 35 is no longer locked by virtue of the pawl portion 116 engaging ratchet 75, it being understood of course that the locking occurs by virtue of the gear linkages between shaft 35 and the drive shaft 57.

While I have shown and described a specific embodiment of this invention, further modifications and improvements will occur to those skilled in the art. I desire it to be understood, therefore, that this invention is not to be limited to the particular form shown and I intend in the appended claims to cover all modifications which do not depart from the spirit and scope of this invention.

What I claim is:

1. In a gyroscopic device having a rotor mounted on a gimbal; means supporting said gimbal for rotation about a gimbal axis; a caging and uncaging apparatus for controlling said gimbal to caged and to uncaged conditions, said apparatus including motor means effective when energized to control said gimbal to one of said conditions; holding means effective when energized to maintain said gimbal in said one of said conditions after said motor means has controlled said gimbal to said one of said conditions, said holding means being effective in the manner indicated after said motor means becomes de-energized; auxiliary holding means adapted to be energized and de-energized coextensively with said holding means and having means adapted to augment said holding means so as to maintain said gimbal in said one of said conditions for a predetermined time interval after de-energization of said holding means; override means operative at a predetermined time interval after energization of said motor means for rendering said motor means inoperative; and means responsive to said gimbal being controlled to said one of said conditions for disabling said override means.

2. In a gyroscopic device having a rotor mounted on a gimbal; means supporting said gimbal for rotation about a gimbal axis; a caging and uncaging apparatus for said gimbal, said apparatus including motor means effective when energized to uncage said gimbal; holding means effective when energized to maintain the uncaged condition of said gimbal after said motor means has uncaged said gimbal; auxiliary holding means adapted to be actuated and having means adapted to augment said holding means so as to maintain the uncaged condition of said gimbal for a predetermined time interval after de-energization of said holding means; override means operative at a predetermined time interval after energization of said motor means for rendering said motor means inoperative; and means responsive to said gimbal being uncaged for disabling said override means.

3. In a gyroscopic device having a rotor mounted on a gimbal for rotation about a gimbal axis; a caging and uncaging apparatus for controlling said gimbal including resilient spring means for rotating said gimbals to a caged position and motor means adapted when energized for uncaging said gimbal; holding means effective when energized to maintain the uncaged condition of said gimbal and normally effective when de-energized to permit said spring means to cage said gimbal; auxiliary holding means adapted to be energized and having means adapted to augment said holding means so as to maintain the uncaged condition of said gimbal independent of the energization of said holding means for a predetermined time interval after the de-energization of said holding means; override means operative at a predetermined time interval after energization of said motor means for rendering said motor means inoperative; and means responsive to said gimbal being uncaged for disabling said motor means and said override means.

4. In a gyroscopic device having a rotor mounted on a gimbal; means supporting said gimbal for rotation about a gimbal axis; a caging and uncaging apparatus for controlling said gimbal to caged and to uncaged conditions, said apparatus including control means effective when actuated to control said gimbal to one of said conditions; holding means effective when energized to maintain said gimbal in said one of said conditions after said gimbal is controlled to said one of said conditions; auxiliary holding means adapted to augment said holding means so as to maintain said gimbal in said one of said conditions for a predetermined time interval after de-energization of said holding means; override means operative at a predetermined time interval after actuation of said control means for disabling said control means and means responsive to said gimbal being controlled to said one of said conditions for disabling said override means.

5. In a gyroscopic device having a rotor mounted on inner and outer gimbals to provide for two mutually perpendicular displacement axes, a caging and uncaging apparatus for controlling said gimbals including resilient spring means for rotating said gimbals to a caged position and motor means for uncaging said gimbals; holding solenoid means effective when energized to maintain said gimbals in the uncaged condition and normally effective when de-energized to permit said spring means to cage said gimbals; auxiliary holding means adapted to be energized and de-energized simultaneously with said holding solenoid means and having a portion adapted to be displaced when energized into engagement with said holding solenoid means so as to hold said holding solenoid means in said energized position so as to maintain said gimbals in the uncaged condition, said auxiliary holding means including time delay means for delaying the disengaging of said holding solenoid means subsequent to the de-energization of said auxiliary holding means.

6. In a gyroscopic device having a rotor mounted on a plurality of gimbals to provide for a plurality of rotational axes, a caging and uncaging apparatus for controlling said gimbals to caged and to uncaged conditions including resilient spring means for rotating said gimbals to one of said conditions and motor means for controlling said gimbals to the other of said conditions; holding means effective when energized to maintain said gimbals in one of said conditions and normally effective when de-energized to permit said gimbals to be controlled to the other of said conditions; auxiliary holding means adapted to be energized and de-energized simultaneously with said holding means and having means adapted when energized to augment said holding means, and said auxiliary holding means also including time delay means for delaying the termination of the augmentation of said holding means subsequent to the de-energization of said auxiliary holding means.

7. In a gyroscopic device having a rotor mounted on a gimbal; means supporting said gimbal for rotation about a gimbal axis, a caging and uncaging apparatus for controlling said gimbal to caged and to uncaged conditions, said apparatus including means effective to control said gimbal to one of said conditions; holding means effective when energized to maintain said gimbal in said one of said conditions after said gimbal is controlled to said one of said conditions; and auxiliary holding means adapted to augment said holding means so as to maintain said gimbal in said one of said conditions for a predetermined time interval after de-energization of said holding means.

8. In a gyroscopic device having a rotor mounted on a gimbal for rotation about a gimbal axis; a caging and uncaging apparatus for controlling said gimbal including first means for controlling said gimbal to a caged condition and second means for controlling said gimbal to an uncaged condition; holding means effective when energized to maintain said gimbal in one of said conditions said holding means being effective for a predetermined time interval after being de-energized.

9. In a gyroscopic device having a rotor mounted on a gimbal; means supporting said gimbal for rotation about a gimbal axis; a caging and uncaging apparatus for controlling said gimbal to caged and to uncaged conditions including electric motor means which when energized effects said gimbal to one of said conditions; means for energizing said electric motor means; override means operative at a predetermined time interval after energization of said electric motor means for rendering said motor means inoperative; and means responsive to said gimbal being effected to said one of said conditions for disabling said override means.

10. In a gyroscopic device having a rotor mounted on a gimbal; means supporting said gimbal for rotation about a gimbal axis; a caging and uncaging apparatus for controlling said gimbal to caged and to uncaged conditions including electric motor means which when energized uncages said gimbal; means for energizing said electric motor means; override means adapted to be energized coextensively with said motor means and being operative at a predetermined time interval after energization of said electric motor means for rendering said motor means inoperative; and means responsive to said gimbal being uncaged for disabling said override means.

11. In a gyroscopic device having a rotor mounted on a gimbal; means supporting said gimbal for rotation about a gimbal axis; an apparatus for controlling said gimbal to caged and to uncaged conditions including motor means which when actuated controls said gimbal to one of said conditions; means for actuating said motor means; override means operative at a predetermined time interval after actuation of said motor means for disabling said motor means; and means responsive to said gimbal being controlled to said one of said conditions for disabling said override means.

References Cited in the file of this patent
UNITED STATES PATENTS

| | | |
|---|---|---|
| 2,441,307 | Alkan | May 11, 1948 |
| 2,555,981 | Lynch et al. | June 5, 1951 |
| 2,645,129 | Brown | July 14, 1953 |
| 2,654,254 | Wendt | Oct 6, 1953 |
| 2,795,142 | Smith | June 11, 1957 |